US006614551B1

(12) United States Patent
Peek

(10) Patent No.: US 6,614,551 B1
(45) Date of Patent: Sep. 2, 2003

(54) EMAIL CAPABLE FAX MACHINE AND METHODS FOR USING THE SAME

(75) Inventor: Gregory A. Peek, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/448,073

(22) Filed: Nov. 23, 1999

(51) Int. Cl.[7] .......................... B41B 1/40; G06F 15/00; H04N 1/00; H04N 1/32; G06K 9/00
(52) U.S. Cl. ...................... 358/1.15; 358/440; 358/468; 382/181; 382/186
(58) Field of Search ............................ 358/1.15, 402, 358/442, 468, 440; 382/181, 186, 187

(56) References Cited

U.S. PATENT DOCUMENTS

| | | | | |
|---|---|---|---|---|
| 5,247,591 A | * | 9/1993 | Baran ......................... | 382/179 |
| 5,461,488 A | * | 10/1995 | Witek ......................... | 358/402 |
| 5,805,298 A | * | 9/1998 | Ho et al. ..................... | 358/402 |
| 6,104,500 A | * | 8/2000 | Alam et al. ................. | 358/1.15 |
| 6,195,694 B1 | * | 2/2001 | Chen et al. ................. | 709/220 |
| 6,389,124 B1 | * | 5/2002 | Schnarel et al. ....... | 379/142.01 |

* cited by examiner

Primary Examiner—Edward Coles
Assistant Examiner—Jason Sherrill
(74) Attorney, Agent, or Firm—Paul E. Steiner

(57) ABSTRACT

A fax machine works as a fax machine, and is capable of sending and receiving image data by email. In addition to a fax type scanner and fax type printer, the device includes an alphanumeric keyboard, a processor and a memory. The device is configured as a customer for an internet service provider, with its own email address, i.e., a user name and password. The device includes an internet type modem that is set up for calling either another fax machine or a customer number of the provider. The user enters in the keyboard either the telephone number of the other fax machine, or the email address of the addressee. The processor determines which one is entered by examining the entry for the "169" character of an email address. If it is a regular fax transmission, the other fax machine is dialed, and the document is scanned and transmitted. If it is an email transmission, the document is stored, converted into an internet type graphics file, and then emailed as an attachment to the email address through the internet service provider. The email is received by a human email user who can view the file in a screen of a personal computer without needing a fax machine. Alternately the email is received by another fax machine of the invention, which stores it, converts it to fax type data, and then prints it as if receiving a regular fax transmission.

18 Claims, 6 Drawing Sheets

EMAIL CAPABLE FAX MACHINE AND METHODS FOR USING THE SAME

BACKGROUND OF THE INVENTION

1. Field of the Invention

The present invention is related to the field of fax machines.

2. Description of the Related Art

Fax machines are used for communicating images. They do this by scanning an image, generating corresponding data according to a fax protocol, and transmitting the data. The data can be transmitted during scanning, or stored and transmitted when scanning is complete.

A prior fax machine is now described with reference to FIG. 1. Fax machine 20 includes a processor 22, and a memory 24 for temporarily storing the fax type data. A fax type modem 26 is coupled with the processor, and with a telephone line 28.

Fax machine 20 is typically capable of both a transmit and a receive operation. In both cases the data is transferred through the telephone line. Both operations are described with reference to FIG. 2, where fax machine 20 performs a transmit operation and a second fax machine 30, which is substantially identical to fax machine 20, concurrently performs a receive operation.

Fax machine 30 is coupled by a telephone line 32 to a network 34. Line 28 is also coupled to network 34.

A numeric keypad 36 of fax machine 20 is used to enter the telephone number that addresses fax machine 30 through the network. Typically a display 38 on the calling machine shows the telephone number that is being entered. The processor activates the modem, which dials the entered telephone number.

A telephone connection is established when telephone lines 28 and 32 become connected through network 34. Then a series of tones by each machine to the other establish a fax type handshake, according to a fax protocol.

A sheet 40 bears an image 42 that is to be transmitted. Image 42 is scanned by a fax type scanner 44 (FIG. 1) of fax machine 20. Fax type scanners may be different from other types of scanners. In FIG. 2 the scanner 44 is under a bar 46 that defines a slit. As sheet 40 is moved through the slit, the image is scanned.

Scanning generates fax type data that represents the image. This data is generated according to a standard protocol for fax machines.

The data is then transmitted from fax machine 20 through the connected telephone lines to fax machine 30. As it is being transmitted, the fax type data is represented as arrow 38.

In the receive operation, incoming fax type data is received through a modem into a processor of the receiving fax machine. The data is then forwarded (also known as applied) to a special fax-type printer 50 of the fax machine. A fax type printer is responsive to fax type data. The data causes the printer to print, on its own paper 52, a facsimile 54 of image 38.

In both the transmit and the receive operations, only fax-type data is sent and received over the telephone line. As such, fax machines are limited to communicating only with other fax machines. In addition, faxing requires tying up two telephone numbers concurrently. Once connected, they have to stay connected, typically for the relatively long time it takes to scan.

BRIEF SUMMARY OF THE INVENTION

The invention provides an email capable fax machine that includes a fax-type scanner to scan an image to generate fax type data that corresponds to the image. The fax machine further includes a keyboard to accept an entry of a telephone number or an email address, and a processor to interpret whether the keyboard entry is a telephone number type or an email address type. The processor converts the fax type data into internet type data corresponding to the image if the type is interpreted to be an email address type. The fax machine further includes a modem coupled with the processor to dial a destination telephone number and a predetermined internet service provider depending on the type.

DETAILED DESCRIPTION

Generally, the invention provides an email capable fax machine that works as a fax machine, and is further capable of sending and receiving graphic data by email. The device includes a processor, a memory and an internet type modem. The device is configured as a customer for an internet service provider (ISP), with its own email address, i.e., a user name and password. It includes an internet type modem that is set up for calling either another fax machine or a customer number of the ISP.

The fax machine of the invention further includes an alphanumeric keyboard for entering either the telephone number of the destination fax machine, or the email address of the destination. The processor determines if a transmission is a regular fax transmission or an email transmission.

The email capable fax machine of the invention includes a fax-type scanner for scanning the image. This generates fax type data for the image. For a regular fax transmission, the modem dials the destination telephone number, and the fax data is transmitted without modification.

For an email transmission, the processor converts the fax type data into internet type data, such as a .gif file. The modem dials the customer number, establishes a computer type handshake, and then sends the data via an email feature to the destination email address. This is performed by appropriate internet software that resides in the processor.

For reception, the email capable fax machine of the invention calls the internet service provider periodically. When it receives a new email message, a graphics file is received as an attachment. The processor converts the attached file into fax type data.

The fax machine of the invention preferably further includes a fax type printer. The received data, whether it is fax type data from another fax machine, or a graphics file that has been converted to fax type data, is sent to the printer where it is printed as a fax message.

As has been mentioned, the present invention provides a fax machine that is capable of sending and receiving data by email. Embodiments of the invention can be either new products, or upgrades for existing fax machines.

An embodiment is now described with reference to FIG. 3. It will be recognized that some of the features of this embodiment are used for transmit operations, some for receive operations, and some for both. A device that includes all these features can perform both types of operations.

Email capable fax machine 100 is preferably provided as a standalone unit 100. It has a processor 110, and an associated memory 120.

Figure 1:
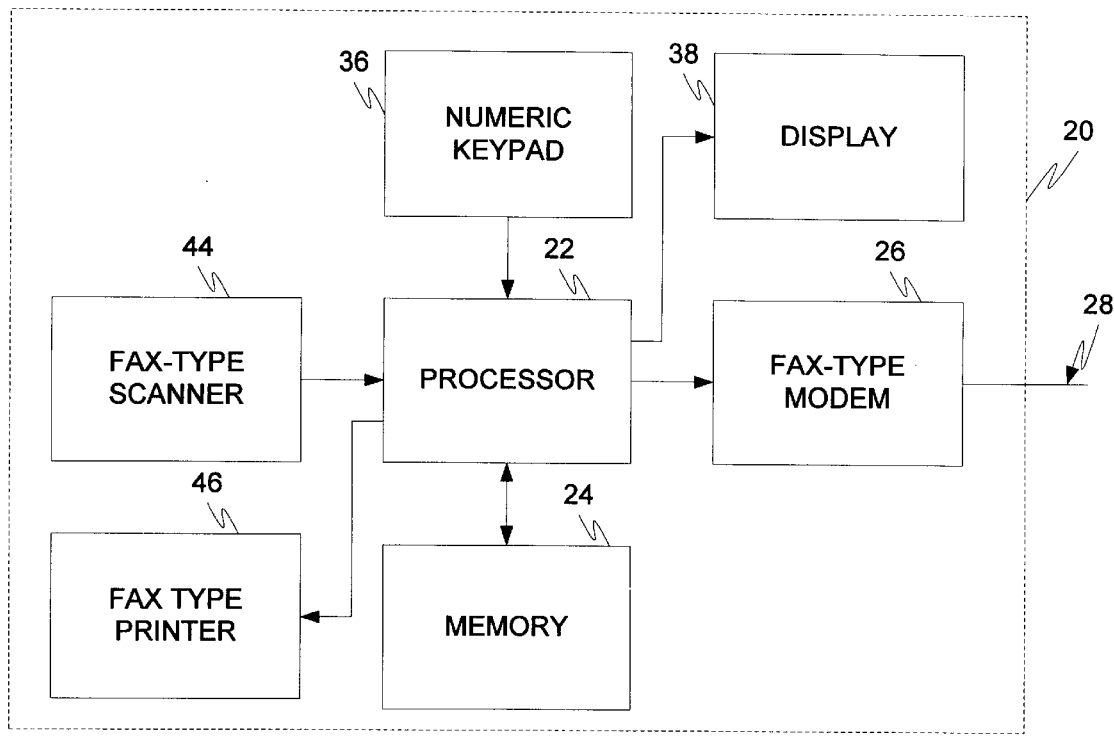
FIG. 1 is a block diagram of a prior fax machine.
Figure 2:
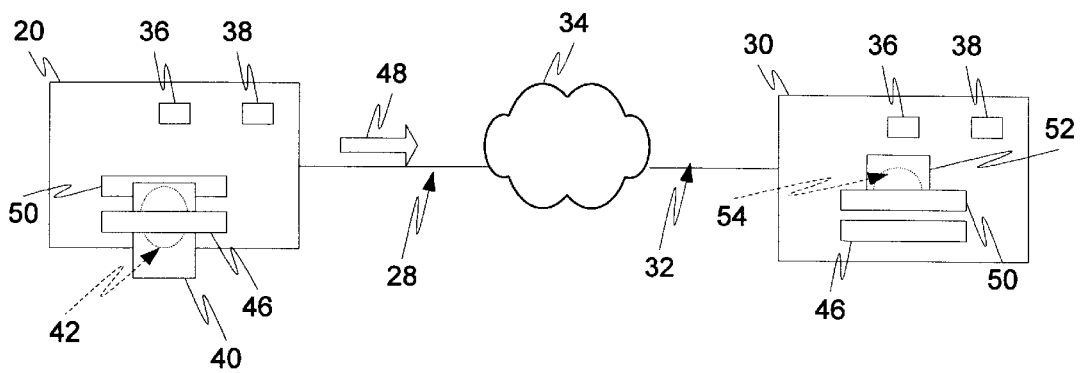
FIG. 2 is a diagram illustrating an operation of two prior fax machines.

Fax machine 100 preferably also includes a scanner 140 and a printer 146. As will be appreciated, these can be satisfactorily implemented by a fax type scanner and a fax type printer similar to those of FIG. 1. Fax machine 100 also carries a stock of paper for printer 146 that can be replenished. When the scanner scans the image, it generates fax type digital data that corresponds to the image. When this fax type data is applied to or received by the fax type printer, the printer then prints the image on the paper carried by the fax machine.

Optionally fax machine 100 further includes a manual switch 150. The switch has two positions, one for a fax operation and one for an email operation. The user sets the switch depending on the desired operation. The processor 110 includes a feature that senses the position of switch 150, and thus can determine the intended operation.

Fax machine 100 moreover includes a keyboard 160. The keyboard 160 is preferably alphanumeric, i.e., it includes a single stroke key for each letter of the alphabet in use. It also includes a key for the character "@", which is used in email addresses. A keyboard 160 that works very well is a full "QWERTY" type keyboard.

It is desirable that fax machine 100 also include a display 170. The display 170 shows the keyboard entry and other status information. The display 170 is preferably a multi-line LCD display, such as a 4×40 type display.

The user types in the keyboard 160 an entry for the intended destination address, which is thus input in the processor 110. The entry of the intended destination is either a telephone number (numeric) or an email address (alphanumeric, i.e., letters and numbers). The email address can be that of another email capable fax machine made according to an embodiment of the invention. Or it can be an email account of a human user. If it is an email account, a graphics file will be transmitted and will thus be received in an email program on a personal computer, or on an equivalent device.

The processor 110 interprets the type of entry, and therefore what operation is intended. In different embodiments of the invention, the processor 110 determines the type in different ways. In one embodiment, the processor 110 senses the position of the switch 150. In another embodiment, the processor 110 determines the type by examining the entry itself. For example, the processor 110 can scan the characters of the entry for the "@" character. Absent that character, the processor 110 can determine that the address is a telephone number. This would eliminate the need for including a switch.

If the entry is an email address, the processor 110 converts the fax type data into internet type data that corresponds to the image. Internet type data is data that corresponds to images according to internet type encodings, such as a graphic compression encoding format. For black/white images, .gif is preferred; for color images, .gif or .jpeg can be used.

The conversion can be accomplished in a number of ways, as will be discerned by a person skilled in the art in view of the present description. For example, the fax type data can be written into the memory first, and then converted. Alternately, the fax type data can be converted as it is being generated, concurrently with scanning.

Conversion is preferably expedited by two optional additional features according to embodiments of the invention. These features preferably include a software component, or program, that resides in the processor 110. The features are implemented by scanning and performing image processing on the stored image to detect portions where there is writing. It will be appreciated that both these features reduce the required connection time, as they transmit email text instead of graphics file data.

The first such feature is handwriting recognition. Some approaches to handwriting recognition are well known in the art. The feature can distinguish at least a portion of the stored data as handwriting type data. The processor then converts the handwriting type data of the image to email text type data, which is also known as email type data.

The second such feature is recognition of only mechanically printed characters. The feature can be implemented by adapting a known optical character recognition (OCR) system, first by subtracting the optics, etc. Again, the processor then converts the recognized printed characters in the image to email type data.

Implementing these features should be coordinated, because they affect each other. If the printed characters are first recognized and removed from the image file, the slower handwriting recognition system will move faster through the reduced image file.

Alternately, as is further known in the art, a handwriting recognition feature can be made to also recognize printed characters as a special type of handwriting, thus making an optical character recognition feature unnecessary.

The email type data can be ASCII text, or other text that can be emailed. It will be transmitted as an email text message accompanying the graphics file. The text message can be removed from the image file before transmission. This will reduce the size of the resulting graphics file that will accompany the message. The resulting graphics file is then called a reduced image file, that will have to be reconstructed at the destination by reinserting the removed text.

In both cases of transmitting to a second fax machine and to an email address, the data initially travels through a telephone line 180 coupled with fax machine 100. Additionally, the destination is at an endpoint of a network of telephone lines. The destination is addressable by either the email address of the recipient, or the telephone number of the receiving fax machine which is also referred to herein as a destination telephone number.

Fax machine 100 also includes a modem 190. The modem 190 is an internet compatible modem, preferably a V.90 modem. The modem 190 is coupled to the processor 110 and to telephone line 180. The modem dials a telephone number depending on the type of entry.

If the entry is a telephone number, then the modem dials the destination telephone number, which is typically the entered address, or at least a portion of it. In other words, in order to send a fax, the user enters an address that is of a telephone number type. This can be either a telephone number alone, or also some other information. For example, to denote to the fax machine 100 that a telephone number is intended for a fax operation, the user might first enter a special character such as an asterisk. In that case, only a portion of the entered address is dialed. When a handshake is established with the called fax machine, the modem transmits the fax type data.

If the entry is an email address, then the modem dials the customer telephone number of a predetermined Internet Service Provider (ISP). When a handshake is established with the server computer of the ISP, the modem transmits the internet type data.

The processor 110 includes features for exchanging data, such as sending and receiving email. Such features are preferably implemented with software programs. Exchange of data is through the internet, via at least one internet protocol. Examples of internet protocols include Point to Point Protocol (PPP), Transmission Control Protocol/Internet Protocol (TCP/IP), the Internet's Post Office Protocol (POP3), and Internet Messaging Access Protocol (IMAP).

As such, the invention includes a software program that resides in the processor 110, although it can reside in any other computer-readable medium. The program includes software that accepts a data entry of either one of a telephone number and an email address, and software that interprets a type of the data entry to be one of at least a telephone number type and an email address type. Further, the program includes software that converts the fax type data into internet type data corresponding to the image, if the type is interpreted to be an email address type. Additionally, the program includes software that exchanges the internet type data over a network with a device coupled with the network.

The software interprets the type of the data entry by determining whether the data entry includes an "@" character. If it determines that it is so, the software determines that the data entry is an email address type.

A user of a fax machine made according to an embodiment of the invention can engage the services of an Internet Service Provider (ISP), that has a predetermined telephone number for customers to call in, and gain access to the server computer of the ISP. The user can configure the fax machine 100 as a regular customer of the ISP, with its own user name and password. Alternately, the fax machine 100 can be used as part of a Local Area Network (LAN), or a Wide Area Network (WAN).

Methods of using the devices made according to various embodiments of the invention are now described in more detail. A transmit method is described with reference to FIGS. 4A, 4B, and 4C, and a receive method is described with reference to FIG. 5. In both cases the email capable fax machine is coupled to a telephone line for communicating electronically, as mentioned above.

Figure 3:
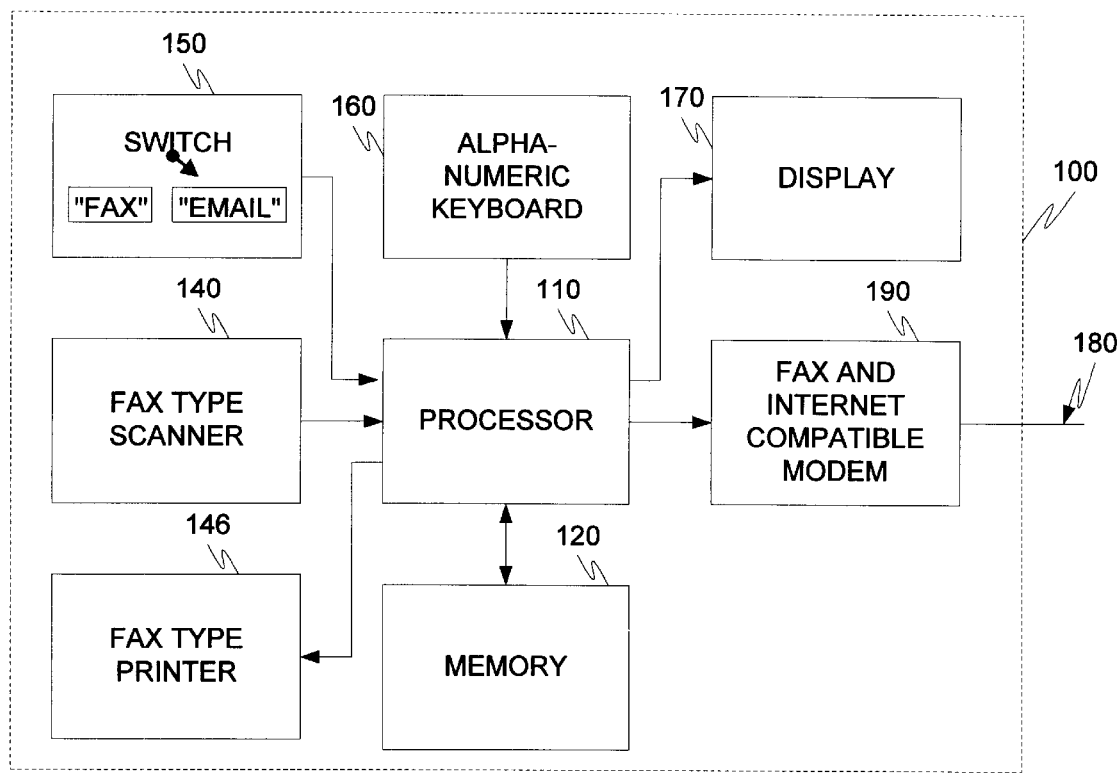
FIG. 3 is a block diagram of an email capable fax machine made according to an embodiment of the invention.
Figure 4A:
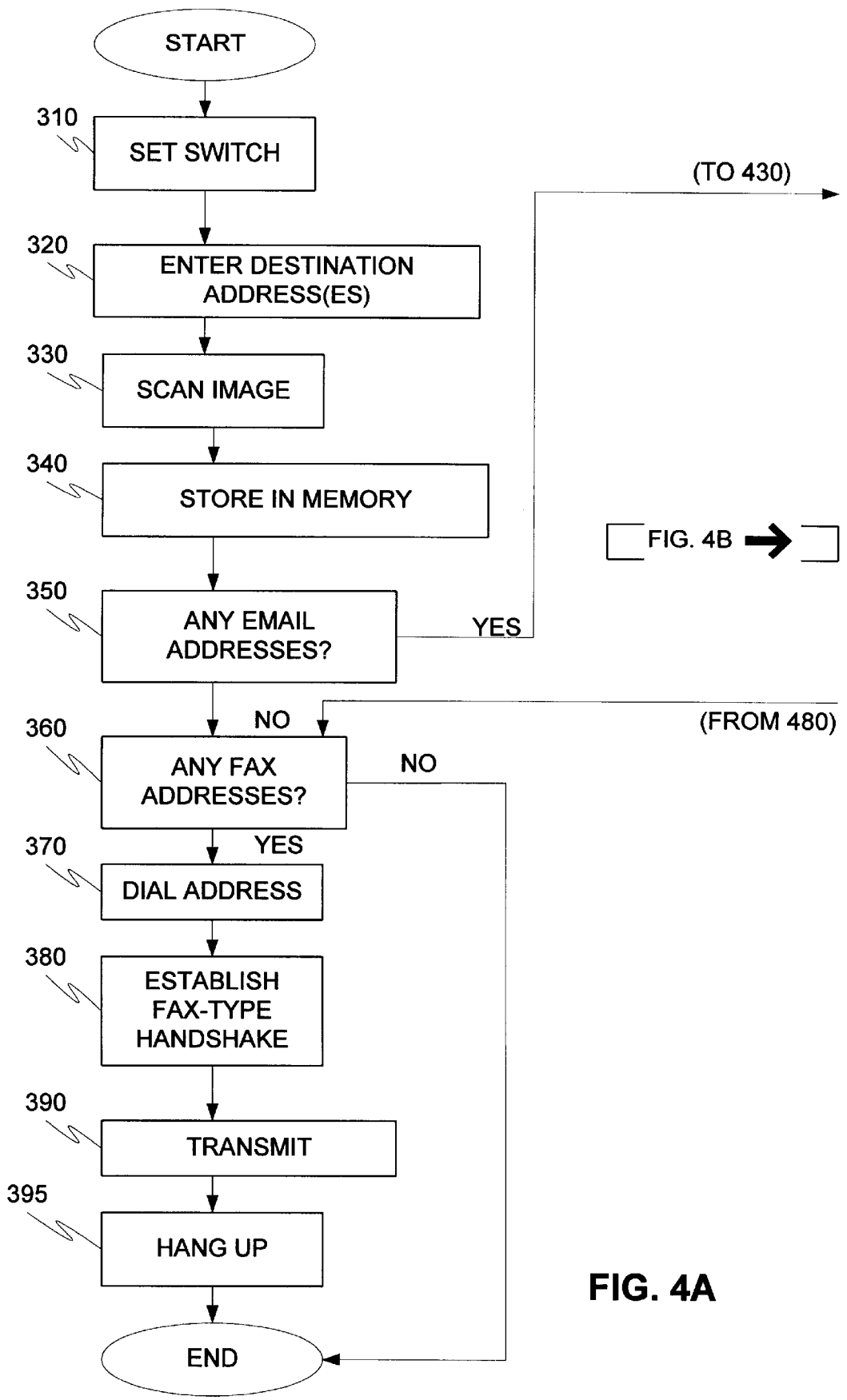
FIGS. 4A, 4B, and 4C, when placed adjacent each other, illustrate a flowchart of a transmit method according to an embodiment of the invention.
Figure 5:
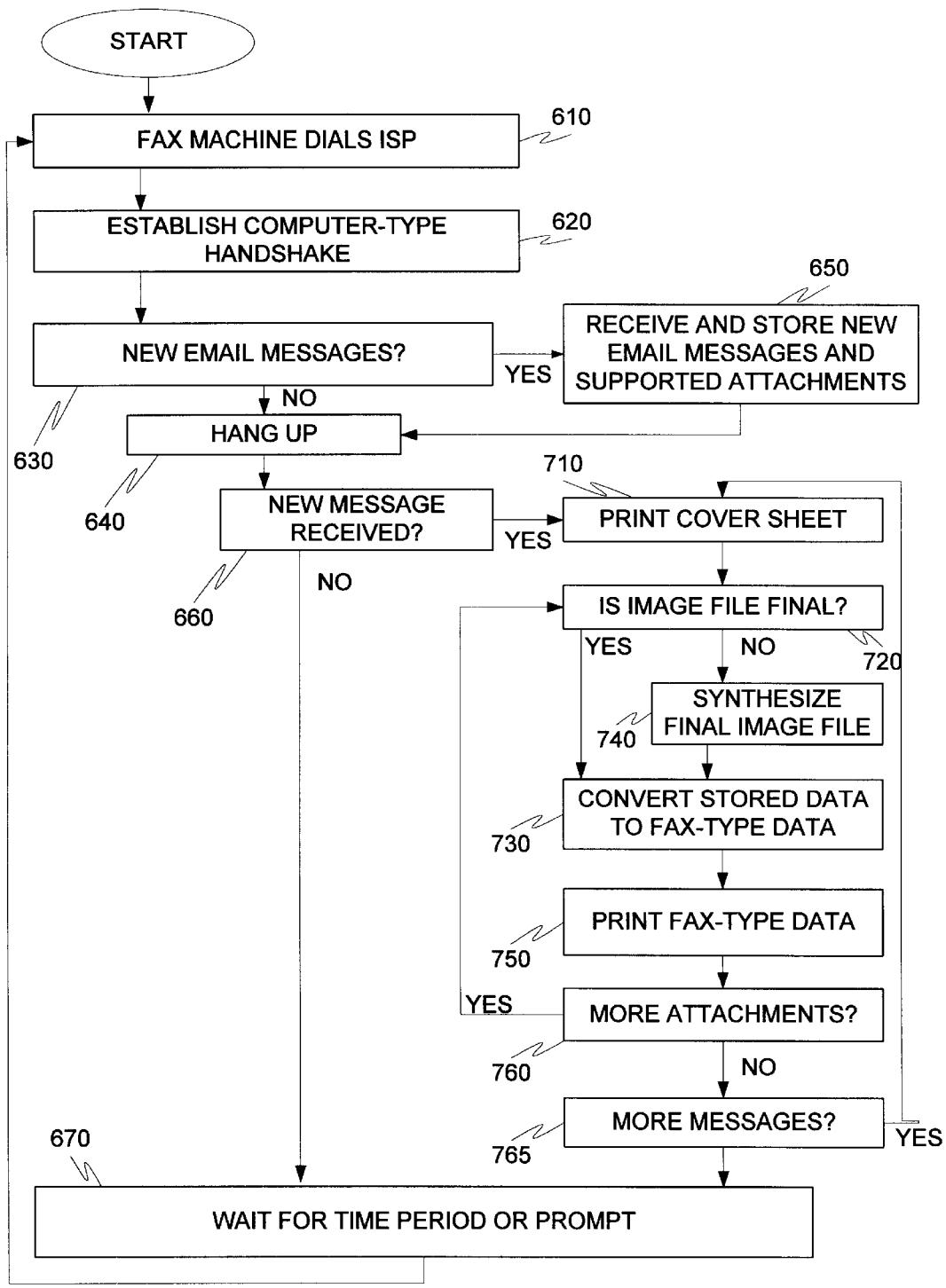
FIG. 5 illustrates a flowchart showing a receive method according to an embodiment of the invention.

Referring to FIG. 4A, according to box 310, if a switch, like switch 150 in FIG. 3, is provided, it is set to either a "FAX" position or an "EMAIL" position. The setting determines if the transmission will be a fax transmission to a fax machine, or an email transmission.

According to a next box 320, the user enters the destination address in the alphanumeric keyboard of the fax machine. The address can be a fax number or an email address.

According to a next box 330, the fax machine scans the image. This generates fax type data corresponding to the image. By fax type data it is meant data scanned by the scanner, not necessarily fax encoded and correspondingly compressed.

According to a next box 340, the scanned image is shared in the memory. Scanning and storing can take place concurrently.

Then, the fax machine determines if the transmission will be a fax transmission or an email transmission. As also described above, the fax machine can determine this by sensing the position of the switch, or by examining the type of the entered address. For example, if the characters include the character "@", then it can be inferred that it is an email address. Alternately, a special code can be entered from the keyboard as part of the destination address, such as by using a special key or a special character.

This is preferably accomplished by first examining for email addresses according to box 350. If there are no email addresses, then the destination address is examined for fax addresses according to box 360. If there are no fax addresses, the process ends.

If it is determined that it will be a fax transmission, then the machine operates as a standard fax machine. In particular, according to box 370, a modem of the fax machine dials another fax machine. It does that by dialing the destination telephone number, which is the entered destination address or at least a portion of it.

Then the fax machine establishes a fax type handshake with the called machine, according to box 380. This can be accomplished by the two fax machines issuing a series of tones to each other, according to known fax machine protocols.

Then, according to box 390, the fax machine transmits the stored image data to the called fax machine via the telephone line. Alternately, the fax machine can scan the image to generate fax type data, and concurrently transmit it to the fax machine.

After transmission is complete, the modem hangs up the telephone line, according to box 395, and the machine is ready for another use.

If it is determined that there will be at least one an email transmission, then a different succession of boxes takes place after box 350.

Figure 4B:
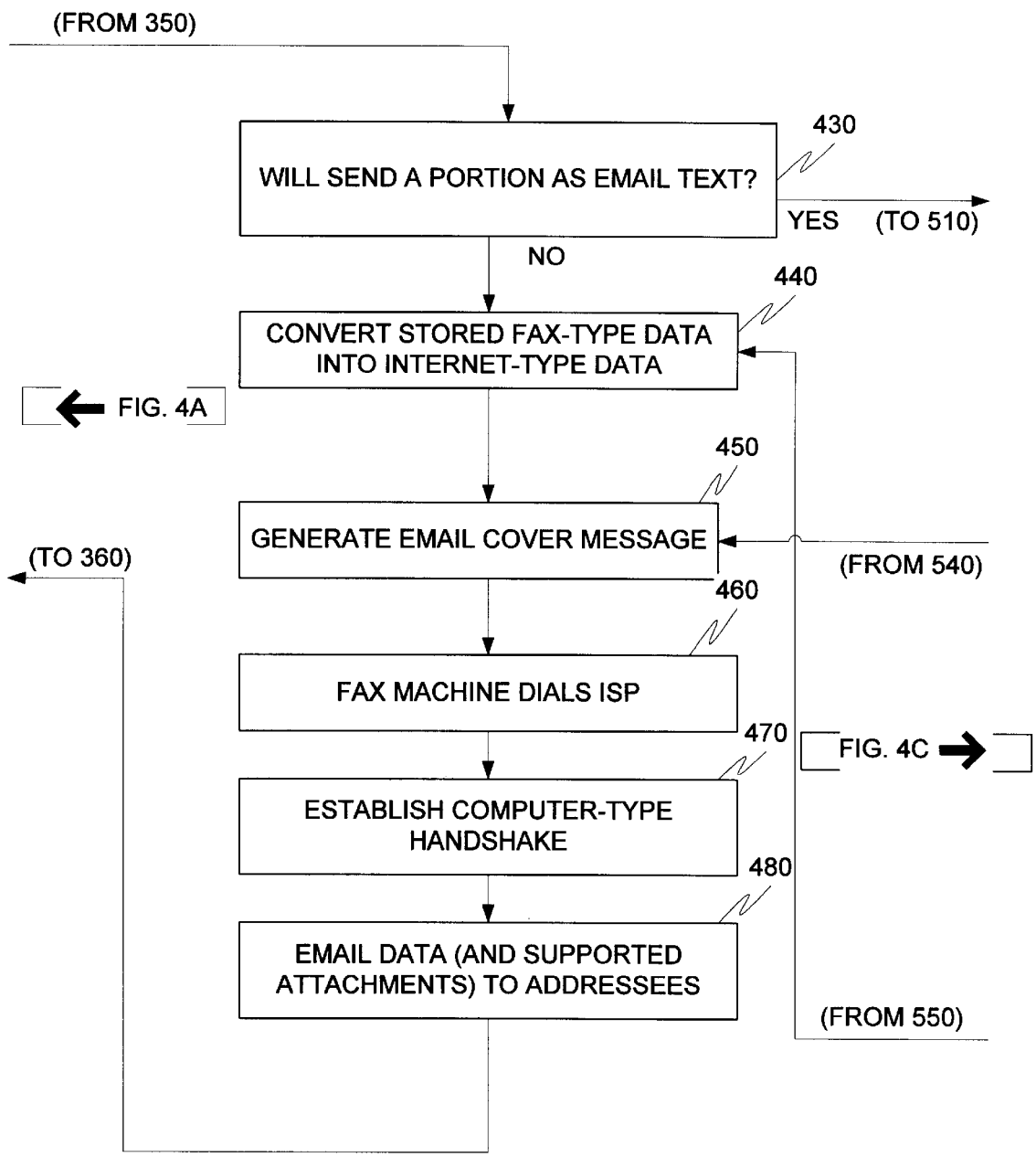

Referring to FIG. 4B, according to a subsequent, optional box 430, it is determined by a feature of the email capable fax machine if a portion will be sent as email text, to save time.

If not, then according to a next box 440, the fax machine converts the fax type data into internet type data corresponding to the image. By internet type data, it is meant data transmissible over a network, such as the internet, WAN, or a LAN, etc. The conversion is performed as described above, for example according to a graphic compression encoding format, which produces an image data file such as a gif file. The person skilled in the art will discern in view of the present description that it may be advantageous to switch the order of box 430 with that of other boxes.

Then, according to another box 460, the fax machine optionally generates transmission cover sheet data. This data is a collection of information denoting the source and time of the transmission. The data can be transmitted as email text, and printed as the cover sheet at the destination. This email text will carry the image file as an attachment according to an internet type encoding, such as Multipurpose Internet Mail Extension (MIME) protocol.

Figure 4C:
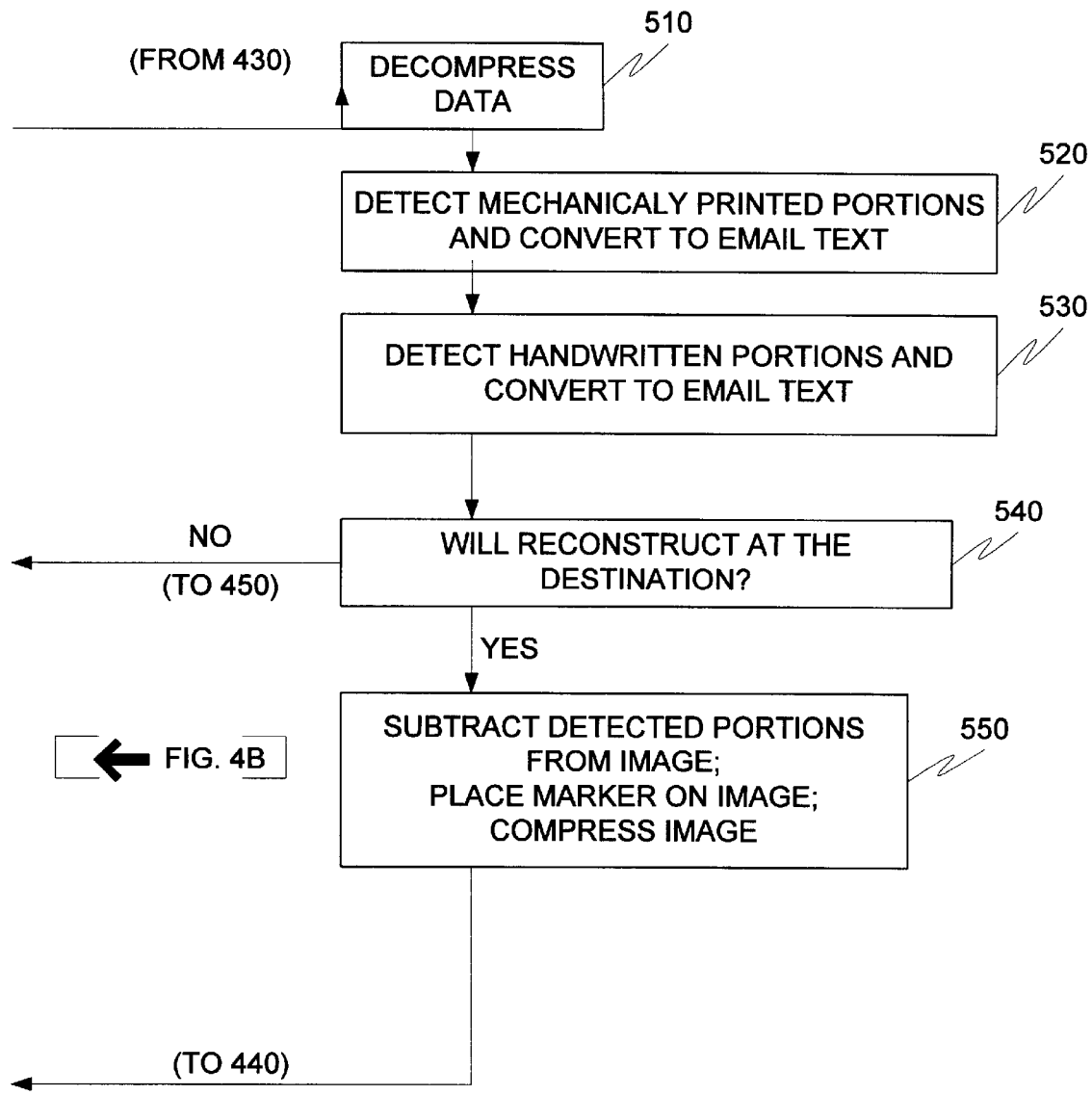

If, at box 430, it is determined that a portion will be sent as email text, reference must be made to FIG. 4C. According to box 510, if the fax type data is also compressed, it is decompressed. This reveals again the text portions.

According to next box 520, the fax machine optionally scans the data to identify any portions that have mechanical printing, such as typed or printed material. If any are detected then the typed characters are identified (as described above), and converted into email.

According to a next box 530, the fax machine optionally scans the data to identify any handwritten portions. If any are detected then, according to box 452, the handwritten characters are identified (as described above), and converted into email.

According to a next box 540, it is determined if the image will be reassembled, or reconstructed, at the destination. If not, the image will be transmitted only as email, and execution proceeds to box 450.

If yes, then according to box 550 the detected portions (from boxes 520 and/or 530) are subdivided from the image and indexed. Markers are placed in the image to assist reconstruction. Then the image can be recompressed to fax type data. Then execution proceeds to box 440, and from there to box 450.

According to a next box 460, the fax machine dials the customer telephone number of the predetermined internet service provider (ISP).

According to a next box 470, the fax machine establishes a computer type handshake with a server computer of the ISP. This is accomplished in successive steps. The fax machine can emulate a personal computer, by transmitting data corresponding to its user name and password to the server computer of the ISP, etc.

According to a next box 490, the fax machine emails the final message to the entered address of the network destination. For an internet embodiment, this is accomplished by transmitting it to the server computer of the ISP using an internet protocol. The final message is the internet type data, which includes the optional transmission cover sheet and the attached image file(s).

Afterwards execution continues with box 360 of FIG. 4A, as described above.

Another embodiment of the invention is to send hyper text mark up language (HTML) formatted mixed graphics and text. The HTML graphics appears as an attachment that must be saved to disk, and displayed with another program.

Some attachments, such as .wav sound files, are left on the e-mail server and on the cover page. The presence of these unprintable attachments can be noted, so the user can use a personal computer to retrieve them and view (or hear) them, if desired.

As per the above, at least the following email modes are possible:

1) Default mode. All data is captured as graphics. It can be reproduced as one graphical attachment per page. The e-mail text message is a simple cover sheet created by the software from information provided when the user first configured the fax machine.

2) Text mode. All data is generated by OCR (or handwriting recognition) and sent as a single text message, no attachments.

3) Mixed mode. The invention's software tries to find areas of text and areas of graphics. All of the text can be completely contained in the e-mail text message, with textual references to attached graphics files for any areas that appeared to be non-text data to the software.

Alternatively, each time the scanned data changes from text to graphics or graphics to text, a new attachment is created. In this case, every-other attachment would be text. Other ways of mixing the text and graphics using attachments are possible. For example, Adobe's .pdf format could be used to mix text and graphics.

4) HTML mode. The invention works also with e-mail programs that are capable of sending and receiving messages formatted with HTML codes. In HTML, it is possible to format a page with mixed text and graphics.

When sending faxes, the user can select which mode to use with special buttons on the fax machine. Alternately, the machine's software could examine the data and try to automatically pick what it determines to be the best mode. The software can have built-in criteria to weigh time of transmission versus fidelity of reconstruction. These criteria can be the default, that can be overridden by a user choice. Choices 1) and 2) above would probably give the best, most reliable results. If there are any graphics at all, then the user would select 1) (or at least not select 2). If the fax is all text, and many are, then the user (or software) would choose 2).

A fax machine made according to an embodiment of the invention works also in a receive mode. A receive method of the invention is now described with reference to FIG. 5.

First, by way of initial preparation, the user inputs in fax machine 100 a customer telephone number of a predetermined ISP. The customer telephone number is provided by the ISP for access to the server computer of the ISP, and from there to the internet. The user also inputs other information, such as the user name, password, etc.

According to box 610, when prompted by the user, the fax machine dials the customer telephone number of the network, ISP, or message center. This is performed similarly to box 460 of FIG. 4B.

Optimally, the fax machine will be set up for calling the ISP for messages periodically, without needing prompting by the user. This can be accomplished by implementing autodialing. By way of preparation for that, the user inputs in the fax machine an adjustable time period for calling the customer telephone number.

According to box 620, the fax machine establishes a computer type handshake with the network, ISP, or message center. This is performed similarly to the above described box 470 of FIG. 4B.

According to box 630, the fax machine inquires for new email messages using an internet protocol, or other network protocol, as described above.

If, at box 630, there are new messages then, according to box 650, the fax machine receives, or downloads, the email messages using a network protocol, as described above. Preferably, it stores it in the memory 120. Each message includes header information, such as sender, time sent, and subject, in text format. Each message contains a text message body, although this may lack data. Each message can additionally contain one or more attachments. These attachments may contain text, graphics, or other types of computer data (for example sound, video, or application specific formatted computer data). Then, according to box 640, the modem 190 of the fax machine 100 hangs up.

If, at box 630, there are no messages then, according to box 640, the fax machine hangs up.

Next, according to box 660, it is inquired if a new message was just received and downloaded. If not, then, according to box 670, the fax machine 100 of the invention waits for the time period or for another prompt, and then dials again the customer number of the ISP (i.e. returns to box 610).

After receiving and storing the email data, it is preferably checked to determine that all attachments are supported types. If not, a copy of the message is left on the e-mail server, for possible later access by a computer.

Next, a cover sheet is printed, according to a box 710, containing the e-mail sender's address and name, the list of recipients, the time sent, the subject, list of attachments and whether any were unknown and left on the e-mail server, and then the text of the message body.

Then, according to box 720, it is inquired whether there are more attachments. Equivalently, it is determined whether the image file is final, meaning whether there will be an image, and any text attachments will be added back in, to indexed markers.

If not final, then according to box 740, a final image file is synthesized.

The invention can receive and print text, some common graphical formats, and in a sophisticated model, even .pdf (Adobe's "universal" format for communicating documents with mixed text and graphics) and .html (the format for web pages which supports mixed text and graphics).

Common types for attachments are text files (.txt), graphical files (.gif or .jpg, etc), Adobe's .pdf file format for mixed graphics and text, application specific file formats, such as .doc for Microsoft Word or .xls for Microsoft Excel, or even sound files (.wav or .mp3) or movie files (.avi). Most of these file types are not understood by the e-mail software, and must be saved to the computer's hard disk and viewed using the appropriate application.

If, yes, and also after box 740, according to box 730, the fax machine converts the internet type data into fax type data that corresponds to the image. This means that the image is converted into data compatible with standard data formats for fax machines. In addition, the email header, also known as transmission cover sheet data, is placed in a format that would print a cover sheet in a fax machine.

According to a next box 750, the fax machine prints the image. This is accomplished by applying the fax type data to a fax type printer of the fax machine. The fax machine can only print each of the parts of the e-mail message as it receives them. Text messages and attachments can be printed as text. Graphical attachments can be printed as graphics. HTML attachments can be assembled and printed as mixed graphics and text, much as a web browser assembles and displays a web page. Each part of the incoming e-mail can be printed separately, either sequentially on the same page, or on separate pages.

Execution then proceeds to box 760, when it is inquired if there are any more attachments. If the type of the attachment is supported, it is converted and printed as above, else it is ignored.

Again it will be appreciated that, given the formats for the stored images, it may be advantageous to change the order of some of these boxes to expedite the image processing.

Execution then proceeds to box 765. If there are any more messages, the process is repeated for each. If not, execution returns to box 670.

The fax machine also receives fax-type data and prints it as a regular fax machine. When dialed, if not busy, the fax machine picks up the telephone line, and exchanges tones for a fax type handshake, as is known in the art.

The email capable fax machine of the invention has more advantages than fax machines of the prior art. It can send a message even though the destination may be busy, without having to wait. And it can receive a message that is sent to it while it is busy.

If the destination is a similar email capable fax machine, the invention can transmit data faster by emailing instead of faxing, which alleviates congestion in networks. If the destination is a human user with a personal computer, that user no longer needs to own a fax machine, or a fax card for the personal computer.

A person skilled in the art will be able to practice the present invention in view of the present description, where numerous details have been set forth in order to provide a more thorough understanding of the invention. In other instances, well-known features have not been described in detail in order not to obscure the invention.

While the invention has been disclosed in various embodiments, they are not to be considered in a limiting sense. Indeed, the invention can be modified in numerous ways. For example, many of the individual method steps can be performed in a different manner. Applicant regards the subject matter of the invention to include all combinations and subcombinations of the various elements, features, functions and/or properties disclosed herein. The following claims define certain combinations and subcombinations, which are regarded as novel and non-obvious.

Additional claims for other combinations and subcombinations of features, functions, elements and/or properties may be presented in this or a related application for patent. Such additional claims are also regarded as included within the subject matter of applicant's invention irrespectively of whether they are broader, narrower, or equal in scope to the original claims.

The invention claimed is:

1. An email capable fax machine comprising:

a fax-type scanner to scan an image to generate fax type data corresponding to the image;

a keyboard to accept an entry of either one of a telephone number or an email address;

a processor to interpret a type of the keyboard entry to be one of at least a telephone number type and an email address type, and to convert the fax type data into internet type data corresponding to the image if the type is interpreted to be an email address type; and a modem coupled with the processor to dial one of the destination telephone number and a predetermined internet service provider depending on the type, wherein the processor includes a feature to distinguish at least a portion of data corresponding to the image as handwriting type data and to convert the handwriting type data to email type data.

2. The fax machine of claim 1, further comprising a switch having a first position corresponding to a fax operation and a second position corresponding to an email operation, and wherein the processor includes a feature to interpret the type depending on the position of the switch.

3. The fax machine of claim 1, further comprising a display showing a keyboard entry that is an email address.

4. An email capable fax machine, comprising:

a fax-type scanner to scan an image to generate fax type data corresponding to the image;

a keyboard to accept an entry of either one of a telephone number or an email address;

a processor to interpret a type of the keyboard entry to be one of at least a telephone number type and an email address type, and to convert the fax type data into internet type data corresponding to the image if the type is interpreted to be an email address type; and a modem coupled with the processor to dial one of the destination telephone number and a predetermined internet service provider depending on the type, wherein the processor includes a feature to distinguish at least a portion of data corresponding to the image as mechanically printed type data, and to convert the mechanically printed type data to email type data.

5. The fax machine of claim 1, further comprising a memory associated with the processor, and wherein the memory is to store the internet type data.

6. The fax machine of claim 1, wherein the internet type data corresponds to the image according to a graphic compression encoding format.

7. A method for transmitting data corresponding to an image comprising:

scanning the image to generate fax type data corresponding to the image;

entering a destination address;

determining whether a type of the entered destination address is an email address type or a telephone number type;

if the type is a telephone number type, dialing at least a portion of the entered destination address, else if the type is an email address type, dialing an internet service provider;

distinguishing at least a portion of data corresponding to the image as handwriting type data; and converting the handwriting type data to email type data.

8. The method of claim 7, further comprising setting a switch to one of a first position corresponding to a fax operation and a second position corresponding to an email operation, and sensing the position of the switch to determine the type of the destination address.

9. The method of claim 7, further comprising:

examining characters of the entered address for an "@" character; and if an "@" character is found, determining that the type of the entered address is an email address type, else if an "@" character is not found, determining that the type of the entered address is a telephone number type.

10. The method of claim 7, further comprising converting the fax type data into internet type data corresponding to the image, if the type is an email address type.

11. The method of claim 7, further comprising storing the internet type data in a memory of the fax machine.

12. The method of claim 7, further comprising transmitting data corresponding to the scanned image.

13. The method of claim 7, further comprising:

generating transmission cover sheet data; and transmitting the transmission cover sheet data.

14. A method for transmitting data corresponding to an image, comprising:

scanning the image to generate fax type data corresponding to the image;

entering a destination address;

determining whether a type of the entered destination address is an email address type or a telephone number type;

if the type is a telephone number type, dialing at least a portion of the entered destination address, else if the type is an email address type, dialing an internet service provider;

distinguishing at least a portion of data corresponding to the image as mechanically printed type data; and converting the mechanically printed type data to email type data.

15. A method for receiving data corresponding to an image through a telephone line comprising:

receiving through the telephone line internet type data corresponding to the image;

converting the internet type data into fax type data corresponding to the image;

applying the fax type data to a fax type printer to print the image;

storing the internet type data in a memory, wherein the stored internet type data is organized in a reduced image file; and synthesizing a final image file from the reduced image file.

16. The method of claim 15, further comprising:

dialing a customer telephone number of a predetermined internet service provider (ISP); and checking the ISP for any received email messages.

17. The method of claim 16, further comprising:

dialing the customer telephone number again after a preset time period.

18. The method of claim 15, further comprising:

receiving email type data corresponding to transmission cover sheet data;

converting the email type data into fax type data; and applying the fax type data to a fax type printer to print a facsimile of the transmission cover sheet data.

* * * * *

UNITED STATES PATENT AND TRADEMARK OFFICE
CERTIFICATE OF CORRECTION

PATENT NO. : 6,614,551 B1
DATED : September 2, 2003
INVENTOR(S) : Peek

It is certified that error appears in the above-identified patent and that said Letters Patent is hereby corrected as shown below:

<u>Title page,</u>
Item [57], ABSTRACT,
Line 12, delete "169", insert -- @ --.

<u>Column 1,</u>
Line 53, delete "38", insert -- 48 --.

Signed and Sealed this

First Day of June, 2004

JON W. DUDAS
*Acting Director of the United States Patent and Trademark Office*